(12) United States Patent
France (10) Patent No.: US 10,427,737 B2
(45) Date of Patent: Oct. 1, 2019

(54) SHIM FOR TRACK ROLLER FRAME (71) Applicant: Caterpillar Inc., Peoria, IL (US)

(72) Inventor: Sylvain France, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 114 days.

(21) Appl. No.: 15/558,295

(22) PCT Filed: Mar. 22, 2016

(86) PCT No.: PCT/US2016/023508
§ 371 (c)(1),
(2) Date: Sep. 14, 2017

(87) PCT Pub. No.: WO2016/154165
PCT Pub. Date: Sep. 29, 2016

(65) Prior Publication Data
US 2018/0057083 A1 Mar. 1, 2018

(30) Foreign Application Priority Data

Mar. 23, 2015 (GB) .................................. 1504826.7

(51) Int. Cl.
*B62D 55/32* (2006.01)
*B62D 55/15* (2006.01)

(52) U.S. Cl.
CPC ............. *B62D 55/32* (2013.01); *B62D 55/15* (2013.01)

(58) Field of Classification Search
CPC ........ B62D 55/08; B62D 55/15; B62D 55/30; B62D 55/32
See application file for complete search history.

(56) References Cited

U.S. PATENT DOCUMENTS

| 2,468,957 | A | * | 5/1949 | Burks | .................... | B62D 55/15 267/278 |
| 3,382,013 | A | * | 5/1968 | Toth | ........................ | B62D 55/15 305/154 |
| 4,101,177 | A | * | 7/1978 | Bianchi | .................. | B62D 55/30 305/138 |
| 7,100,715 | B2 | | 9/2006 | Mukaino et al. | | |
| 7,237,631 | B2 | | 7/2007 | Livesay et al. | | |
| 2005/0150699 | A1 | * | 7/2005 | Mukaino | ................ | B62D 55/10 180/9.52 |
| 2006/0049692 | A1 | * | 3/2006 | Livesay | ................. | B62D 55/15 305/127 |

(Continued)

FOREIGN PATENT DOCUMENTS

CN 201587463 12/2009
JP 05-254462 A 10/1993

(Continued)

*Primary Examiner* — Kip T Kotter
(74) *Attorney, Agent, or Firm* — Boult Wade Tennant (57) ABSTRACT

A shim for a track roller frame is provided. The shim includes a first surface and a second surface. The first surface and the second surface are laterally spaced apart from each other. The first surface and the second surface define a thickness of the shim therebetween. The shim further includes a retention element formed on it. The retention element is configured to position the shim on the track roller frame. The retention element is also configured to restrict a movement of the shim relative to the track roller frame. The retention element is further configured to couple the shim to the track roller frame.

8 Claims, 5 Drawing Sheets

(56) References Cited

U.S. PATENT DOCUMENTS

2007/0057575 A1* 3/2007 Brandt .................. B62D 55/15
                                                    305/136
2013/0154346 A1   6/2013 Beasley et al.
2016/0176455 A1* 6/2016 Nuechterlein ......... B62D 55/14
                                                    305/125

FOREIGN PATENT DOCUMENTS

| JP | 06-049285 U | 7/1994 |
| JP | 08-301152 A | 11/1996 |
| JP | 09-126224 A | 5/1997 |
| JP | 2010-264911 A | 11/2010 |
| JP | 2012-001011 A | 1/2012 |

* cited by examiner

SHIM FOR TRACK ROLLER FRAME

CROSS-REFERENCE TO RELATED APPLICATIONS

This application is a national phase application of International Patent Application No. PCT/EP2016/023508 filed Mar. 22, 2016, which claims priority to Great Britain Patent Application No. 1504826.7 filed Mar. 23, 2015, both of which are incorporated by reference herein in their entireties for all purposes.

TECHNICAL FIELD

The present disclosure relates to an undercarriage assembly of a machine, and more particularly to a shim for a track roller frame associated with the undercarriage assembly.

BACKGROUND

Track type machines, for example dozers, excavators, and skid-steer loaders, are commonly used in applications where traction is critical or low ground pressure is important. These machines include a frame that supports an internal combustion engine. The machines include left and right undercarriages that are powered by the engine and enable movement of the machine along a ground surface. The left and right undercarriages are rigidly mounted at one end to the frame and are free to pivot in a vertical direction about the mounting location. Each of the undercarriages includes one or more sprockets driven by the engine, and an idler wheel operatively connected to either the frame of the machine or to the sprocket via an idler frame assembly. The idler frame assembly includes a plurality of upper carriers and lower rollers that support an endless track wrapped in a loop around the sprocket and idler.

During operation of a track type machine, components of the undercarriage undergo wear, which may cause a decrease in distance between a bottom surface of the lower rollers and a periphery of the idler wheel. In some instances, this wear can be significant enough that the idler wheel does not engage the track properly and may consequently disrupt engagement of the lower rollers with the track. To avoid such a scenario, removable spacer members or shims are provided for improved spacing between worn components of the assembly. The shims may be used to assist positioning of the idler wheel of a track roller frame associated with the track type machine. The shims may also allow for the idler wheel to slide within the shims for tensioning of the track of the machine. Such shims or spacer members are used as a sacrificial part to avoid wearing of the track roller frame.

However, use of such spacer members is less than optimal, as the spacer members are difficult to install and difficult to retain in position as the components continue to wear and as the idler translates longitudinally relative to a sprocket of the machine. Further, as the machine operates, the shims may easily get lost if they are not secured to the track roller frame, for example via fastening through bolts, welds, etc.

SUMMARY OF THE DISCLOSURE

In one aspect of the present disclosure, a shim for a track roller frame is provided. The shim includes a first surface and a second surface. The first and second surfaces are laterally spaced apart from each other. The first and second surfaces define a thickness of the shim therebetween. The shim further includes a retention element formed on it. The retention element is configured to position the shim on the track roller frame. The retention element is also configured to restrict a movement of the shim relative to the track roller frame. The retention element is further configured to couple the shim to the track roller frame.

In another aspect of the present disclosure, a shim for a track roller frame is provided. The shim includes a first surface and a second surface. The first and second surfaces are laterally spaced apart from each other. The first and second surfaces define a thickness of the shim therebetween. The shim further includes a plurality of retention elements. The plurality of retention elements includes a flange, a first tab, second tab. The plurality of retention elements is configured to position the shim on the track roller frame, restrict a movement of the shim relative to the track roller frame, and couple the shim to the track roller frame.

In yet another aspect of the present disclosure, an undercarriage assembly for a machine is disclosed. The undercarriage assembly includes a track roller frame, an idler, a cover member removably coupled to the track roller frame, and a shim coupled to the track roller frame. The shim includes a first surface and a second surface. The first and second surfaces are laterally spaced apart from each other. The first and second surfaces define a thickness of the shim therebetween. The shim further includes a retention element formed on it. The retention element is configured to position the shim on the track roller frame. The retention element is also configured to restrict a movement of the shim relative to the track roller frame. The retention element is further configured to couple the shim to the track roller frame.

Other features and aspects of this disclosure will be apparent from the following description and the accompanying drawings.

DETAILED DESCRIPTION

Figure 1:
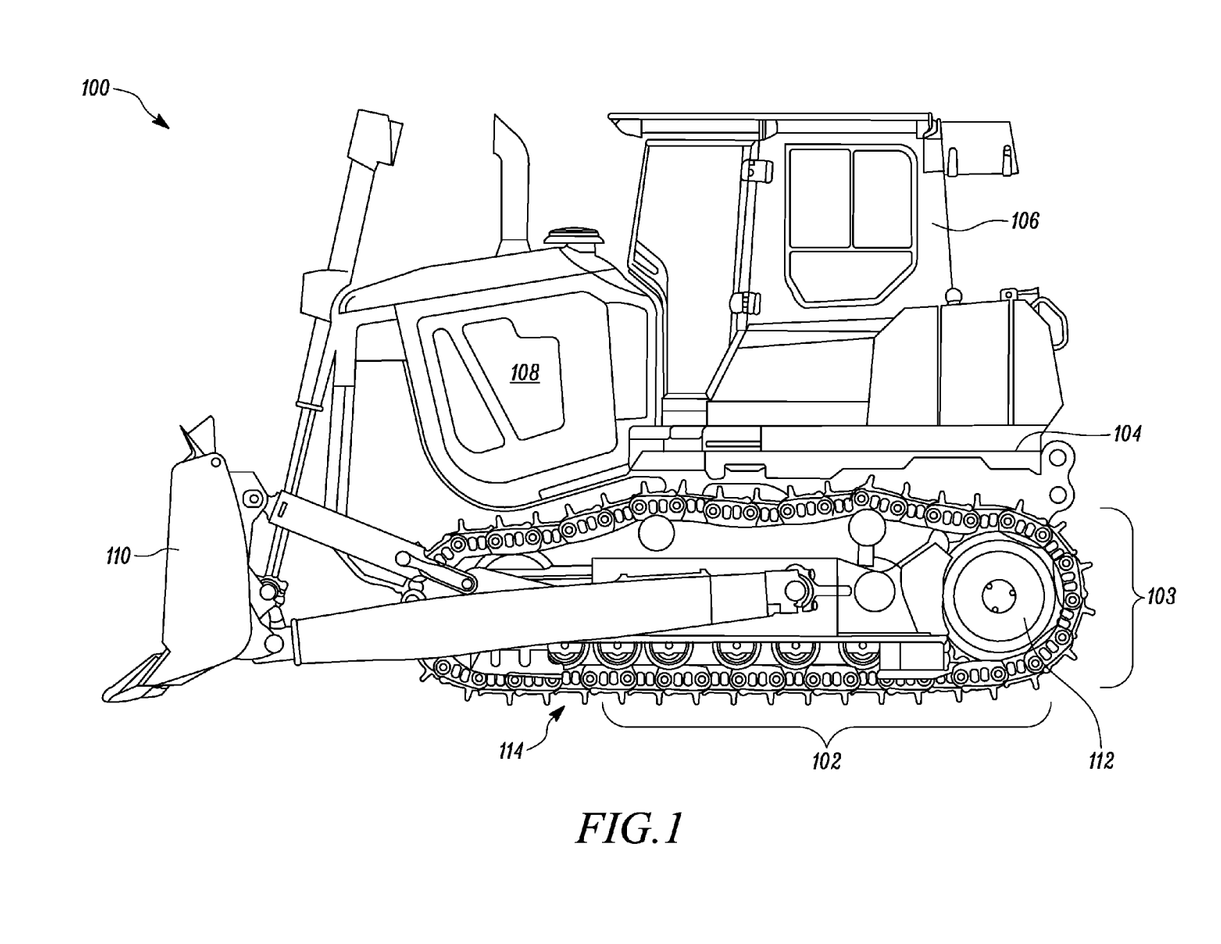
FIG. 1 is a side view of an exemplary machine, according to one embodiment of the present disclosure.

Wherever possible, the same reference numbers will be used throughout the drawings to refer to the same or the like parts. FIG. 1 illustrates an exemplary machine 100. The machine 100 is embodied as a dozer. It should be understood that the machine 100 may alternatively include any other machine used in various industries, such as, mining, transportation, construction, forestry, agriculture, and the like. Further, the machine 100 may be, for example, but not limited to, an excavator, a backhoe loader, and a mining machine.

The machine 100 has a track roller assembly 102 located within an undercarriage assembly 103 positioned on each side of the machine 100 (only one undercarriage assembly 103 is shown in FIG. 1). The machine 100 may include a machine frame 104 at least partially defining an operator station 106 and supporting a front-mounted engine 108 and a work tool 110 operatively supported by the track roller assembly 102 present at a front end of the machine frame 104 and proximate to the engine 108. Alternatively, in some other machines the work tool 110 may not be supported on the track roller assembly 102. The engine 108 may generate a power output that can be directed through a sprocket 112 and a track 114 of the undercarriage assembly 103 to propel the machine 100 and/or move the work tool 110. The design and construction of the undercarriage assembly 103 shown in the accompanying figures is exemplary and does not limit the scope of present disclosure.

Figure 2:
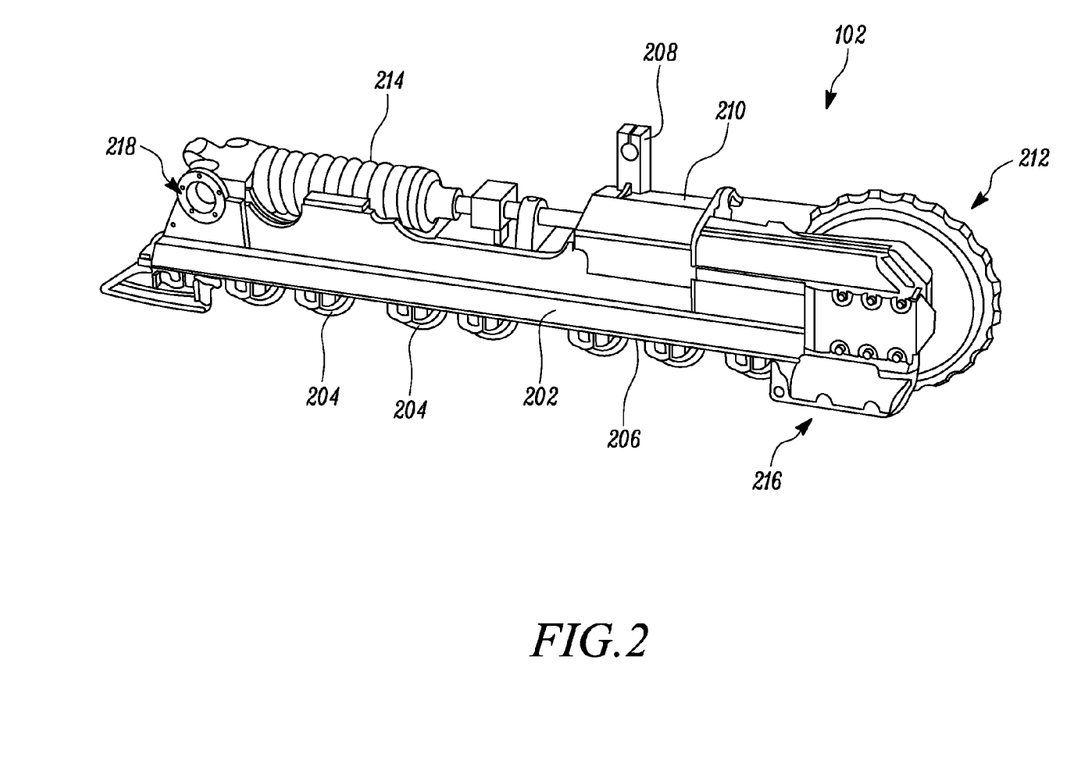
FIG. 2 is a perspective view of a track roller assembly, according to one embodiment of the present disclosure.

Referring to FIGS. 1 and 2, each track roller assembly 102 may include a plurality of components configured to support the track 114. In particular, the track roller assembly 102 may include, a track roller frame 202, a plurality of lower rollers 204 supported by the track roller frame 202 at a lower surface 206, an upper carrier 208 supported by the track roller frame 202 at an upper surface 210 opposite the lower rollers 204, and an idler assembly 212 operatively connected to an end of the track roller frame 202 opposite the sprocket 112. The design and construction of the undercarriage assembly 103 shown in the accompanying figures is exemplary and does not limit the scope of present disclosure. The arrangement of the idler assembly 212 and the positioning and number of sprockets 112 may vary without any limitation.

The idler assembly 212 may be constrained from movement in a vertical direction relative to the track roller frame 202 (i.e., constrained from moving in a direction between the lower and upper surfaces 206, 210) and constrained from moving transversely relative to the track roller frame 202 (i.e., in an axial direction of the sprocket 112) through a suitable biasing means. However, the idler assembly 212 may be allowed to move somewhat in a longitudinal direction of the track roller frame 202 and may be urged away from the track roller frame 202 by a biasing member 214, for example a spring, a grease ram, a gas cylinder, or another track recoil device, as desired. In an embodiment, the idler assembly 212 is provided with a vertical idler adjuster 216 on the track roller frame 202. The track 114 (see FIG. 1) may wrap around the sprocket 112, the lower rollers 204, the idler assembly 212, and the upper carriers 208.

The track roller frame 202 may form a hollow support structure that may partially house the remaining components of the track roller assembly 102 and transfer load from the track 114 and from the work tool 110 to the machine frame 104 (see FIG. 1). In the accompanying figures, the track roller frame 202 is shown as a single fabricated or cast component. In an alternative embodiment, the track roller frame 202 may include a rear component that supports and partially houses the lower rollers 204, the upper carriers 208, and the biasing member 214. The track roller frame 202 may additionally include a separate front component that supports and partially houses the idler assembly 212. In another embodiment, the rear and front components may be joined through any method known in the art, for example, through welding or mechanical fastening.

The track roller frame 202 may include a pivot opening 218 for receiving a pivot bearing (not shown) through which a pivot shaft (not shown) may extend. The pivot shaft may be rigidly connected at a proximal end to the machine frame 104 (see FIG. 1), and the pivot bearing may rotationally connect the track roller frame 202 to a distal end of the pivot shaft. In one embodiment, support arms of the work tool 110 may connect to the machine frame 104 via the pivot shaft. Accordingly, the work tool 110 may pivot about the shaft during lifting and may transfer loads directly to the machine frame 104. In other embodiments, the support arms of the work tool 110 may connect to the track roller frame 202 at another location (e.g., at a location forward of the pivot shaft) such that loads from the work tool 110 can be transferred to the pivot shaft indirectly via the track roller frame 202. The biasing member 214 may also be connected at one end to the machine frame 104 via the pivot bearing and the pivot shaft.

Figure 3:
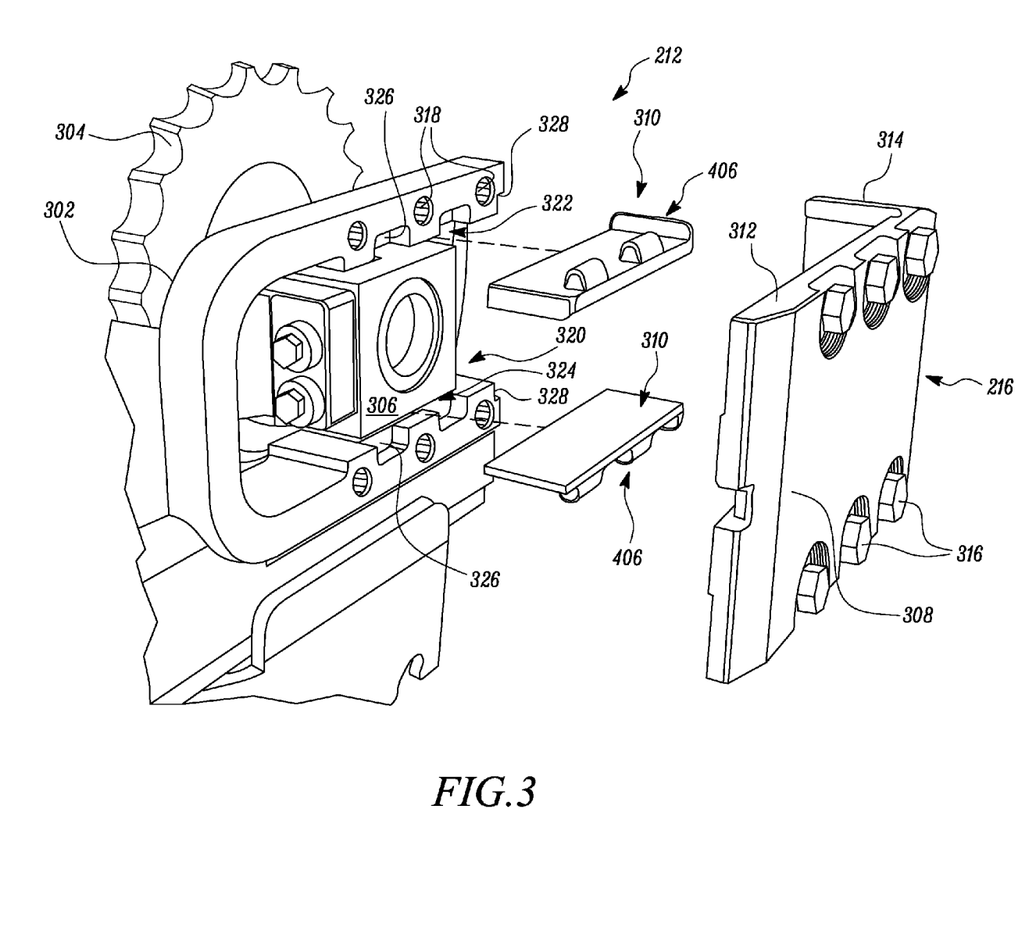
FIG. 3 is a perspective exploded view of a portion of the track roller assembly, according to one embodiment of the present disclosure.

FIG. 3 depicts a partial side perspective exploded view of various components of the track roller frame 202, according to one embodiment of the present disclosure. The idler assembly 212 includes the vertical idler adjuster 216 mounted on an idler yoke member 302. An idler 304 is mounted on the idler yoke member 302 via one or more support blocks 306. It would be appreciated that an idler adjuster similar to the vertical idler adjuster 216 can be provided at the first and second sides of the idler assembly 212. FIG. 3 illustrates the first side thereof, and the present description should be understood to apply similarly to the vertical idler adjusters 216 disposed at both sides of the idler assembly 212.

The vertical idler adjuster 216 includes a cover member 308. The cover member 308 may be L-shaped, and includes a first wall 312 configured to be engaged about the shims 310, and a second wall 314 configured to be engaged about a lateral side 320 of the track roller frame 202. The cover member 308 is further provided with a number of fasteners 316 configured to secure the cover member 308 to the idler yoke member 302 from the first side of the idler assembly 212. The fasteners 316 are configured to be received into a number of receptacles 318, the receptacles 318 being provided on the idler yoke member 302. Alternatively, the cover member 308 may be C-shaped. The vertical idler adjuster 216 further includes one or more shims 310 configured to be received into the track roller frame 202, such that the shim 310 is disposed between the support block 306 and the cover member 308. The shims 310 are preferably identical to one another, and may include elongate metal, plastic, fiber, or the like having at least one edge that is configured to be complimentary to the at least one support block 306 and the cover member 308.

The present disclosure relates to a retention assembly associated with the shim 310 for controlling, restricting or eliminating a movement of the shim 310 relative to the track roller frame 202. Further, the retention assembly is configured to couple the shim 310 to the track roller frame 202 and assist in a positioning of the shim 310 with respect to the track roller frame 202. The structure of the retention assembly will now be described in detail.

Figure 4:
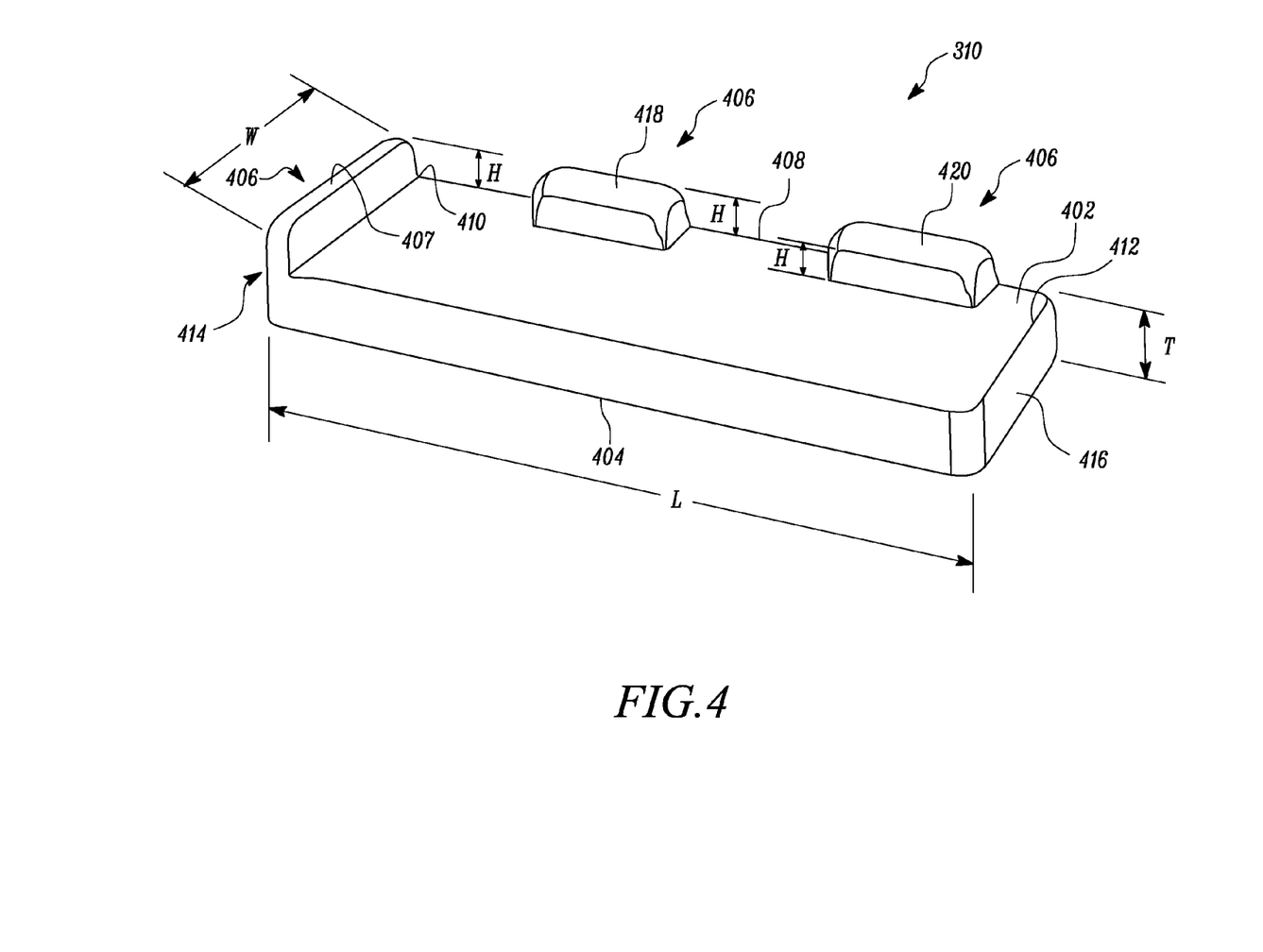
FIG. 4 is a perspective view of a shim, according to one embodiment of the present disclosure.
Figure 5:
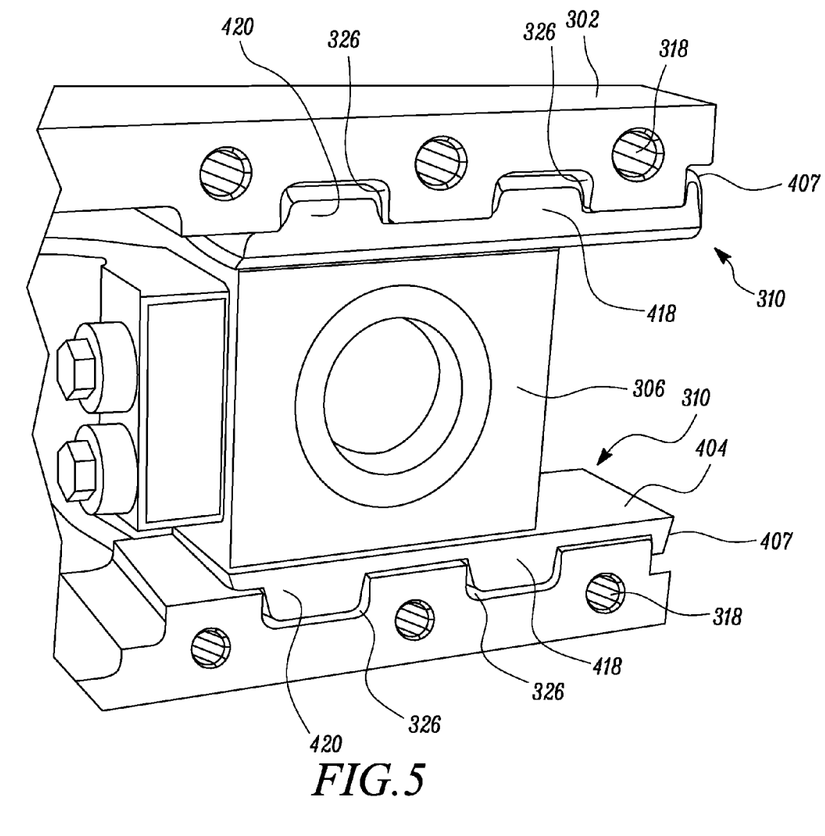
FIG. 5 is another perspective view of the shim installed on the track roller assembly, according to one embodiment of the present disclosure.

As shown in FIGS. 3, 4 and 5, in one embodiment, each of the shims 310 include one or more protrusions, embodied as retention elements 406, that fit with a complementary structure provided on the idler yoke member 302 of the track roller frame 202. Accordingly, the shims 310 are prevented from readily slipping out or moving from their respective positions between the support blocks 306 and the cover member 308. Referring to FIG. 4, the shim 310 includes a first surface 402 and a second surface 404. The first surface 402 and the second surface 404 are provided laterally spaced apart from each other. The first surface 402 and the second surface 404 define a thickness "T" of the shim 310 therebetween.

The one or more retention elements 406 are formed on the shim 310. The retention elements 406 may be formed on the shim 310 through processes such as, machining, forging, welding or the like. The shim 310 has an outer facing edge 408, a leading edge 410, and a trailing edge 412 opposite to the leading edge 410, wherein the leading edge 410 and the trailing edge 412 are perpendicular to the outer facing edge 408. The shim 310 also includes an outer facing side 414 extending from the leading edge 410, and an inner facing side 416 extending from the trailing edge 412. The inner facing side 416 of the shim 310 may have a planar profile. Optionally, the retention element 406 of the shim 310 may include a flange 407 projecting from the outer facing side 414 of the shim 310. The flange 407 may extend from the leading edge 410 of the shim 310. Further, the flange 407 extends along a portion of a width "W" or along the complete width "W" of the shim 310.

The retention element 406 may be embodied as a first tab 418 and a second tab 420, according to one embodiment of the present disclosure. The first tab 418 and the second tab 420 are spaced laterally apart from each other along a length "L" of the shim 310. The first tab 418 and the second tab 420 are provided at the outer facing edge 408 of the shim 310. In an example, the first and second tabs 418, 420 have a rectangular shape. Alternatively, the first and second tabs 418, 420 may include a cylindrical, cubical, cuboidal, triangular, pyramidal, or any regular or irregular geometrical shape. The number of tabs may also vary, based on the system requirements, and is not limited to that described herein.

The flange 407, the first tab 418, and the second tab 420 may extend from a same surface of the shim 310. In an example, the same surface is the first surface 402 of the shim 310. Further, the flange 407 is positioned perpendicular to the first tab 418, and the second tab 420. A height "H" of the flange 407 and that of the first and second tabs 418, 420 are equal. Alternatively, the height of the flange 407 may be greater than the height of the first and second tabs 418, 420. In one embodiment, the height of the flange 407 may be lesser than the height of the first and second tabs 418, 420.

Referring to FIGS. 3 and 5, the shims 310 are removably positioned between the support blocks 306 and the track roller frame 202. The shim 310 may be positioned on a first side 322, a second side 324, or both of the support blocks 306. The retention elements 406, i.e. the flange 407, the first tab 418, and the second tab 420, are configured to position the shim 310 on the track roller frame 202. Referring to FIG. 3, the first side 322 and the second side 324 of the support blocks 306 on the track roller frame 202 are configured to receive the shims 310. The track roller frame 202 includes a number of recesses 326 formed on the first side 322 and the second side 324, and a channel 328 formed on the lateral side 320 of the track roller frame 202. As shown in FIG. 5, the shim 310 is positioned within the track roller frame 202 such that the flange 407, and the first and second tabs 418, 420 respectively are received into the channel 328 and the recesses 326.

The geometry of the recesses 326 and the channel 328 conforms to the geometry of the retention elements 406, thereby enabling easy positioning of the shim 310 with respect to the track roller frame 202. Further, such an engagement of the shims 310 with respect to the track roller frame 202 may restrict, reduce or eliminate a movement of the shim 310 relative to the track roller frame 202. More particularly, the retention elements 406 provided on the shim 310 and may restrict a front and rear movement (along the outer facing edge 408 of the shim 310) of the shim 310 with respect the track roller frame 202. In one embodiment, the retention elements 406 provided on the shim 310 and may restrict a side movement (along the leading edge 410 of the shim 310) of the shim 310 with respect the track roller frame 202. The retention elements 406 couple the shim 310 to the track roller frame 202 and retain the shim 310 in position without requiring the use of any external fastening members.

In an alternate embodiment, the retention element 406 may embody a recess (not shown) formed on the shim 310, and the track roller frame 202 may include corresponding protrusions (not shown) provided on the first and second sides 322, 324 of the support blocks 306. In this case, the recesses on the shim 310 have a geometry that conforms to the protrusions on the track roller frame 202, such that the shim 310 is positioned in the track roller frame 202 as the recesses are received in the corresponding protrusions. Further, such coupling provides a constrained relationship between the shim 310 and the track roller frame 202, thus restricting the movement of the shim 310 relative to the track roller frame 202.

INDUSTRIAL APPLICABILITY

The present disclosure is related to the shim 310 for the track roller frame 202, industrial applicability of which will be readily appreciated from the foregoing discussion. The shim 310 may be utilized in relation to any track type machine where support and/or adjustability of the idler assembly 212 are desired.

As described earlier, the shim 310 acts as a spacer member for spacing between the worn components of the idler assembly 212. The shim 310 includes the retention element 406, i.e. the flange 407 and the first and second tabs 418, 420, that are correspondingly received in the channel 328 and the recesses 326 respectively. In operation, the retention element 406 eases the installation and retaining of the shim 310 in the track roller frame 202. As the shim 310 is retained in the track roller frame 202, the chances of loss of the shim 310 are reduced. Further, provision of the retention element 406 allows the shim 310 to be free from any external fastening means like bolting, welding, etc. Such fastener free arrangement also allows easy replacement of the shims 310 in view of wear. Since the retention elements 406 are provided on the shim 310, and do not require the use of any bulky attachment means extraneous to the track roller frame 202, the solution described herein optimizes on space requirements. This is a cost and time effective solution and results in reduction in downtime of the machine 100. The shim 310 may be produced by forging and machining. Alternatively, the shim 310 may be completely machined. The shim 310 may also be fabricated using a casting.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A shim for a track roller frame, the shim comprising:
  a first surface and a second surface, the first and second surfaces laterally spaced apart from each other, the first and second surfaces defining a thickness of the shim therebetween; and
  a retention element formed on the shim, wherein the retention element is configured to position the shim on the track roller frame, restrict a movement of the shim relative to the track roller frame, and couple the shim to the track roller frame wherein the retention element includes a flange projecting from the shim, and a first tab and a second tab laterally spaced apart from each other along the length of the shim.

2. The shim of claim 1, wherein each of the first and second tabs project from the shim.

3. The shim of claim 1, wherein the flange and the first and second tabs extend from a same surface of the shim.

4. The shim of claim 1, wherein a height of the flange and a height of the first and second tabs are equal to each other.

5. The shim of claim 1, wherein the flange is positioned perpendicular to the first and second tabs.

6. The shim of claim 2, wherein the flange extends at least along a portion of a width of the shim.

7. The shim of claim 1, wherein the flange extends from a leading edge of the shim.

8. An undercarriage assembly for a machine, the undercarriage assembly comprising:
a track roller frame;
an idler;
a cover member removably coupled to the track roller frame; and
a shim coupled to the track roller frame, the shim comprising:
a first surface and a second surface, the first and second surfaces laterally spaced apart from each other, the first and second surfaces defining a thickness of the shim therebetween; and
a retention element formed on the shim, wherein the retention element is configured to position the shim on the track roller frame, restrict a movement of the shim relative to the track roller frame, and couple the shim to the track roller frame
wherein the retention element includes a flange projecting from the shim, and a first tab and a second tab laterally spaced apart from each other along the length of the shim.

* * * * *